(12) United States Patent
Handelsman et al.

(10) Patent No.: US 10,467,931 B1
(45) Date of Patent: Nov. 5, 2019

(54) METHOD OF MANUFACTURING A CAR WINDOW GRAPHIC

(71) Applicant: Loud & Clear Products, LLC, Rancho Santa Margarita, CA (US)

(72) Inventors: Gordon Handelsman, Thousand Oaks, CA (US); Ken Milhous, Thousand Oaks, CA (US)

(73) Assignee: Loud & Clear Products, LLC, Thousands Oaks, CA (US)

( * ) Notice: Subject to any disclaimer, the term of this patent is extended or adjusted under 35 U.S.C. 154(b) by 0 days.

(21) Appl. No.: 15/694,598

(22) Filed: Sep. 1, 2017

Related U.S. Application Data

(60) Provisional application No. 62/382,586, filed on Sep. 1, 2016.

(51) Int. Cl.
*B60R 13/00* (2006.01)
*G09F 19/14* (2006.01)
*G09F 21/04* (2006.01)
*B29C 51/26* (2006.01)
*B41J 3/407* (2006.01)
*B29C 65/02* (2006.01)
*B29K 69/00* (2006.01)
*B29K 67/00* (2006.01)
*B29K 27/06* (2006.01)
*B29L 31/00* (2006.01)

(52) U.S. Cl.
CPC ............ *G09F 19/14* (2013.01); *B29C 51/266* (2013.01); *B29C 65/02* (2013.01); *B41J 3/4073* (2013.01); *G09F 21/048* (2013.01); *B29K 2027/06* (2013.01); *B29K 2067/003* (2013.01); *B29K 2069/00* (2013.01); *B29L 2031/778* (2013.01)

(58) Field of Classification Search
CPC ........ G09F 21/048; G09F 21/04; G09F 3/203; G09F 19/14; B60R 2021/21543; B60R 13/00; B41M 3/008
USPC ................................... 40/453, 454, 591, 593
See application file for complete search history.

(56) References Cited

U.S. PATENT DOCUMENTS

| | | | | |
|---|---|---|---|---|
| 2003/0122844 A1* | 7/2003 | Mueller | .................. | B41J 3/407 345/589 |
| 2006/0080875 A1* | 4/2006 | Nelson | .................... | G09F 21/04 40/593 |
| 2009/0008955 A1* | 1/2009 | Desoto | .................... | G09F 21/04 296/1.08 |

* cited by examiner

*Primary Examiner* — Leslie J Evanisko

(57) ABSTRACT

A graphic, includes a substrate and a printed pattern disposed over the substrate. The substrate is configured to attach to a mounting surface, and is transparent. The printed pattern exposes a nonprinted pattern. The printed pattern is a geometric projection of a graphic design on the mounting surface from a first viewpoint, and the nonprinted pattern is a geometric projection of a transparency design on the mounting surface from a second viewpoint.

7 Claims, 10 Drawing Sheets

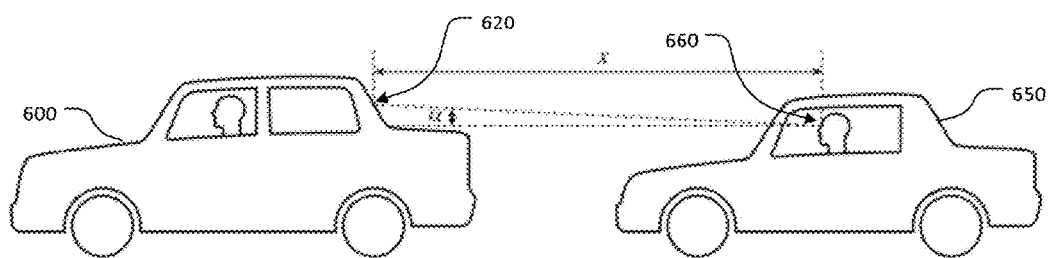
Fig. 6
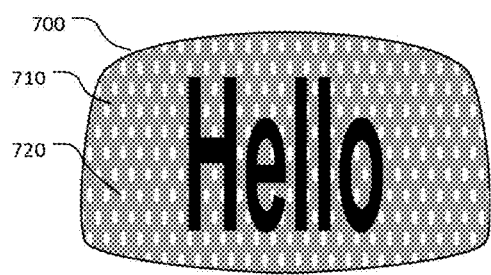 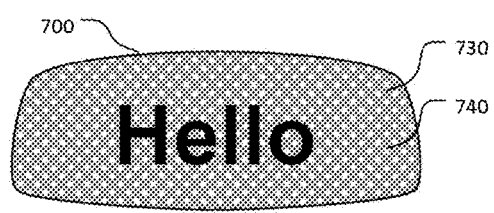
Fig. 7a        Fig. 7b

METHOD OF MANUFACTURING A CAR WINDOW GRAPHIC

CROSS REFERENCE TO RELATED APPLICATIONS

This application claims the benefit of U.S. Provisional Patent Application No. 62/382,586, filed on Sep. 1, 2016, which is incorporated by reference herein for all purposes.

BACKGROUND

Mounted graphics include designs printed on substrates that can be mounted on surfaces. Mounted graphics include window graphics, which can be attached to windows, e.g., building windows, car windows, etc.

In certain applications, a window graphic displays a pattern when viewed from one side of the window, but is perceived as transparent from another side of the window. Creating a window graphic that displays an image, but also transmits light, can be accomplished by printing the image on one side of a substrate material and physically perforating the substrate material. When the perforated window graphic is attached to a window of a structure, a person inside the structure can see through the holes in the perforated substrate to the outside, thereby perceiving the window graphic as transparent.

On the other hand, a person outside the structure may see the image printed on the outside surface of the substrate of the window graphic (i.e., the material remaining after perforation), without perceiving light through the holes.

The window graphic may be physically affixed to the window surface via an adhesive. The window graphic is attached to the window surface by coating the substrate with an adhesive, and fixing the substrate to the window surface. The window graphic may also be covered with a laminate.

In conventional processes, the window graphic is installed on curved mounting surfaces via stretching. The substrate material is flexible and can be pulled and manipulated to 'wrap' around curved surfaces and then cut to size.

However, conventional window graphics have several problems, most notably:

1. The physically perforated "holes" in the substrate are easily filled with dust/debris, restricting light transmission and degrading the window graphic's integrity over time. Certain applications require the additional application of the lamination layer to ensure optical transmission characteristics, product durability, and weather resistance.

2. Physically perforating the substrate weakens the substrate material, thereby making it susceptible to tearing and peeling.

3. Since physical perforation is only feasible with certain materials, the substrate of the conventional window graphic is restricted to certain materials that are easily perforated, that maintain their structure and strength after perforation, that can be stretched, and that can be printed.

4. The perforations and limited substrate materials make the window graphic unsuitable for certain applications, such as under car wiper blades, or when applied to a window with a defroster.

5. The conventional window graphic is difficult to install, and is easily ruined if not installed correctly the first time (wrinkled, etc.). In addition, the image printed on the conventional window graphic is distorted when the window graphic is stretched over a non-flat mounting surface.

6. As a result of the reduced surface area of the substrate due to the holes within the substrate, a relatively strong adhesive is required to ensure a proper bond to the mounting surface. However, strong adhesives increase installation difficulty, increase risk of permanent damage to the mounting surface upon removal, and cannot be removed and re-used.

7. The conventional window graphic is either entirely transmissive to light through the holes, or entirely opaque round the holes, which limits the designs that can be displayed by the window graphic.

8. When the conventional window graphic is mounted on a tilted or curved mounting surface, the image and perforation pattern appears distorted from different viewpoints.

Therefore, current products have poor physical integrity, are restricted to a limited class of materials and applications, are difficult to install, are installed with relatively permanent adhesives, and have limited graphical capabilities. Current products do not optimize light transmission and graphic integrity based upon the window shape and angle and cannot optimize light transmission and graphic integrity based upon the individual graphic design.

In practice, current products use a single substrate; a single perforation pattern; an additional lamination layer. In addition, conventional window graphics generally must be installed by a professional; on vertical surfaces to ensure that light transmission is not impeded; and on surfaces without wiper blades or defrost wires.

BRIEF SUMMARY OF THE DISCLOSURE

According to various embodiments, a car window graphic includes a substrate configured to attach to a mounting surface, the substrate being transparent; a printed pattern disposed over the substrate, the printed pattern exposing a nonprinted pattern.

In an embodiment, the printed pattern is a geometric projection of a graphic design on the mounting surface from a first viewpoint, and the nonprinted pattern is a geometric projection of a transparency design on the mounting surface from a second viewpoint.

In an embodiment, the graphic design is an undistorted image disposed perpendicularly to a line defined from the first viewpoint to a center of the mounting surface, and the transparency design is an undistorted image disposed perpendicularly to a line defined from the second viewpoint to the center of the mounting surface.

In an embodiment, the mounting surface is non-parallel to the graphic design, the transparency design, or both.

In an embodiment, the mounting surface is curved.

In an embodiment, the mounting surface is a surface of a window of a structure, the first viewpoint is located outside of the structure, and the second viewpoint is located inside of the structure.

In an embodiment, the mounting surface is a surface of a rear window of a first vehicle, the first viewpoint is an estimated viewpoint of a driver in a second vehicle behind the first vehicle, and the second viewpoint is an estimated viewpoint of a driver of the first vehicle.

In an embodiment, the printed pattern includes a white opaque ink layer, a transparent color ink layer, and a dark opaque ink layer.

In an embodiment, the printed pattern includes a first portion and a second portion, and the nonprinted pattern isolates the first portion from the second portion.

According to various embodiments, a method of manufacturing a car window graphic includes forming a substrate, the substrate being configured to attach to a mounting substrate and being transparent; depositing a printed pattern over the substrate, the printed pattern exposing a nonprinted pattern. The printed pattern includes a geometric projection of a graphic design on the mounting surface from a first viewpoint, and the nonprinted pattern is a geometric projection of a transparency design on the mounting surface from a second viewpoint.

In an embodiment, the graphic design is an undistorted image disposed perpendicularly to a line defined from the first viewpoint to a center of the mounting surface, and the transparency design is an undistorted image disposed perpendicularly to a line defined from the second viewpoint to the center of the mounting surface.

In an embodiment, the mounting surface is non-parallel to the graphic design, the transparency design, or both.

In an embodiment, the mounting surface is curved.

In an embodiment, the mounting surface is a surface of a rear window of a first vehicle, the first viewpoint is an estimated viewpoint of a driver in a second vehicle behind the first vehicle, and the second viewpoint is an estimated viewpoint of a driver of the first vehicle.

In an embodiment, forming the substrate includes thermoforming a polymeric material to a mold of the mounting surface.

In an embodiment, the method further includes generating three-dimensional (3D) coordinates of the mounting surface, the first viewpoint, and the second viewpoint; generating 3D coordinates of the printed pattern by projecting image data of the graphic design onto the 3D coordinates of the mounting surface from the 3D coordinates of the first viewpoint, and by projecting image data of the transparency design onto the 3D coordinates of the mounting surface from the 3D coordinates of the second viewpoint; and converting the 3D coordinates of the printed pattern into two-dimensional (2D) coordinates along the mounting surface. Depositing the printed pattern on the substrate includes printing one or more ink layers on the substrate in accordance with the 2D coordinates.

In an embodiment, generating the 3D coordinates of the mounting surface includes scanning the mounting surface with a 3D scanner.

In an embodiment, the method further includes attaching the substrate to the mounting surface via a adhesive; and trimming the attached substrate at an edge of the mounting surface.

An apparatus includes a memory storing non-transitory program commands; and one or more processor which, when executing the program commands: generates three-dimensional (3D) coordinates of a mounting surface, a first viewpoint, and a second viewpoint; generates 3D coordinates of a printed pattern by projecting image data of a graphic design onto the 3D coordinates of the mounting surface from the 3D coordinates of the first viewpoint, and by projecting image data of a transparency design onto the 3D coordinates of the mounting surface from the 3D coordinates of the second viewpoint; converts the 3D coordinates of the printed pattern into two-dimensional (2D) coordinates along the mounting surface; and causes a printer to deposit the printed pattern over a substrate, the substrate being configured to attach to the mounting surface, the substrate being transparent and continuous.

BRIEF DESCRIPTION OF THE DRAWINGS

FIG. 6 illustrates an exterior viewing angle according to an embodiment.

FIGS. 7a and 7b illustrate a graphic viewed at different angles according to an embodiment.

DETAILED DESCRIPTION

Figure 1:
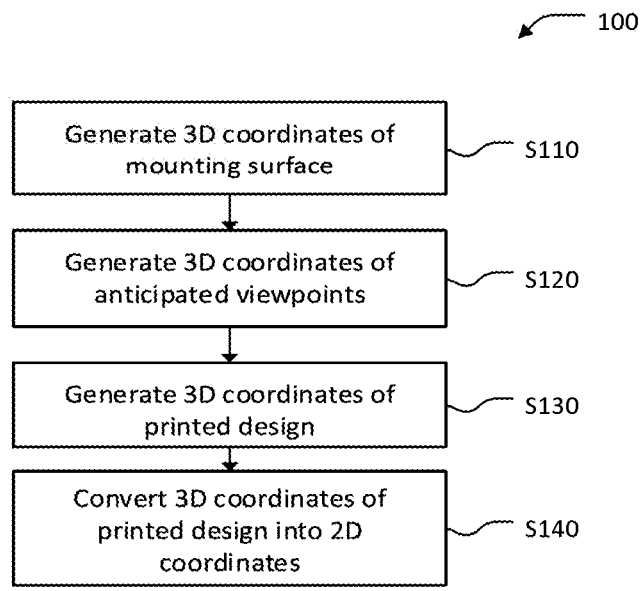
FIG. 1 illustrates a method of generating a surface design of a graphic in accordance with an embodiment.

A graphic in accordance with an embodiment of the present disclosure includes a substrate and a pattern printed on the substrate. The substrate is continuous, that is, unperforated.

In an embodiment, the substrate is transparent. Accordingly, the pattern printed on the substrate may have various levels of transparency, thereby enabling the mounted graphic to display transparent designs.

In an embodiment, the printed pattern includes one or more ink layers arranged to display a printed image on the surface of the substrate. The printed pattern also exposes an unprinted pattern on the substrate. Accordingly, some viewers can see the printed image on the mounted graphic, and other viewers can see through the mounted graphic due to the unprinted pattern.

The mounted graphic is customized for the shape and orientation of the surface it is configured to be mounted on, as well as anticipated viewpoints of different viewers. When the mounted graphic is attached to a mounting surface that is tilted and/or curved, a viewer perceives an undistorted image, rather than the pattern printed along the surface of the substrate. If the pattern printed on the surface of the substrate is the desired graphic design, the viewer therefore sees a distorted version of the desired graphic design.

According to an embodiment of the present disclosure, the printed pattern of the mounted graphic is a geometric projection of the desired graphic design on the mounting surface from the perspective of a viewpoint of the anticipated viewer. Accordingly, the viewer sees the desired graphic design without distortions created by the shape and angle of the mounting surface. The design displayed by the mounted graphic is optimized for the mounting surface and the viewer of the design. When the mounting surface is a rear window of a car, for example, the anticipated viewer may be a driver in another car behind the rear window.

Similarly, according to an embodiment, the unprinted pattern is a geometric projection of a desired transparency design on the mounting surface from the perspective of a viewpoint of an anticipated viewer. Accordingly, the anticipated viewer can perceive the mounting surface as homogenously transparent across the mounting surface. When the mounting surface is the rear window of the car, for example, the anticipated viewer of the transparency design is a driver of the car.

In an embodiment, the substrate is also customized for the mounting surface. For example, the substrate is thermoformed to a mold of the mounting surface. Accordingly, the mounted graphic can be installed on the mounting surface without significantly stretching the mounted graphic over the mounting surface and distorting the design printed on the substrate.

In an embodiment, the mounted graphic is nonperforated, that is, continuous. The continuous substrate lends enhanced physical integrity to the mounted graphic, so that it may be installed using relatively weak and/or temporary adhesives. In addition, an exposed surface of the mounted graphic is relatively flat and physically stable. Accordingly, the mounted graphic can be installed on surfaces with physical fixtures. For example, the mounted graphic can be installed on car windows that are subject to windshield wipers, defrosters, etc.

In an embodiment, the present disclosure relates to graphic configured to be mounted on a surface, and a method of generating the graphic. The graphic may be a window graphic, that is, a graphic configured to be mounted on a window. A material may be deposited on a substrate (e.g. paper, plastic, etc.), which, when affixed to a transparent or semi-transparent surface (e.g. glass, plastic, etc.), enables a person outside of the structure (e.g. car, building, etc.) to 'see' the graphic (e.g. symbols, letters, colors, pictures, photos, etc.), and which enables a person inside of the structure to see through the substrate and view the outside environment.

Embodiments of the present disclosure provide permanent or semi-permanent graphics placed on transparent or semi-transparent surfaces, such as glass. Embodiments are configured to attach to structures such as car windows and buildings.

Embodiments include a graphic affixed to a structure that transmits light while retaining the graphic's high physical integrity (definition, color, etc.).

The graphic enables a person inside the structure to see through the substrate to the outside.

The graphic enable a person outside the structure to see an image patterned on the graphic, i.e. the symbols, photos, pictures, colors, lettering, etc., which is intact and retains its integrity after installation.

The graphic is installed by physically affixing the graphic to the mounting surface.

In addition, the graphic can be installed on surfaces with varying degrees of curvature (e.g. car glass or storefront windows).

FIG. 1 illustrates a method 100 of generating a surface design of a graphic in accordance with an embodiment.

3-dimensional (3D) coordinates of a mounting surface are generated at S110. The 3D coordinates of the mounting surface are generated, for example, using a 3D scanner, a 3D digitizing device such as a MicroScribe G2x Digitizer. In another embodiment, the 3D coordinates are generated by measuring an angle of the mounting surface with respect to a vertical direction and measuring the dimensions of the mounting surface.

In an embodiment, the 3D coordinates of the mounting surface are further generated with sizes and locations of wiper blade attachments that are designed to touch the mounting surface.

The 3D coordinates may be stored in a database. For example, when a rear window of a 2013 Volvo XC60 is used as the mounting surface and is scanned, the information gleaned can be used for all future window graphics designed for other 2013 Volvo XC60 rear windows.

3D coordinates of one or more anticipated viewpoints are generated at S120. In an embodiment, the 3D coordinates of the one or more anticipated viewers are generated by estimating a position of anticipated viewers relative to the mounting surface. For example, the one or more anticipated viewers include a first viewpoint that will perceive an image printed on the mounted graphic, and a second viewpoint that will perceive the mounted graphic as transparent.

In a specific embodiment in which the mounted surface is the rear window of a vehicle, the first viewpoint is at an eye position of an expected viewer outside of the vehicle, e.g., a person driving behind the vehicle, and the second viewpoint is an eye position of an expected viewer inside of the vehicle, e.g., a driver of the vehicle.

The 3D coordinates of the one or more anticipated viewpoints may be derived from structure surface context measurements of a structure including the mounting surface. Structure surface context measurements can be added to the database. The database may be exclusive of any measurement outside of direct contact with the structure. For example, where the surface is the rear window of a car, e.g., a 2013 Volvo XC60, the surface context measurements may include: the range of distances from the driver's seat to various point on the rear window; the height of the vehicle off the ground; the height of the driver seat in the vehicle from the ground; etc.

3D coordinates of a printed design of the mounted graphic are generated at S130. In a specific embodiment, a desired graphic design is virtually projected onto the 3D coordinates of the mounting surface from the 3D coordinates of an anticipated viewpoint. In addition, a desired transparency design is virtually projected onto the 3D coordinates of the mounting surface from the 3D coordinates of an anticipated viewpoint. The 3D coordinates of the printed design are generated by subtracting the projected transparency design from the projected graphic design, for example.

At S140, the 3D coordinates of the printed design are converted to 2D coordinates along the mounting surface. In an embodiment, the 3D coordinates of the printed design are scaled to the 3D coordinates of the mounting surface, thereby producing a flat pattern, which can be printed on a substrate that is attached directly to the mounting surface.

Subsequently, the surface design may be printed on a substrate, and the printed substrate may be installed on the mounting surface. In an embodiment, the substrate is customized to the mounting surface.

The method 100 illustrated in FIG. 1 can be performed using hardware, software, or both. For example, the method 100 can be performed by one or more processors executing non-transitory program instructions, which are stored in a memory or within a computer-readable medium.

Figure 2:
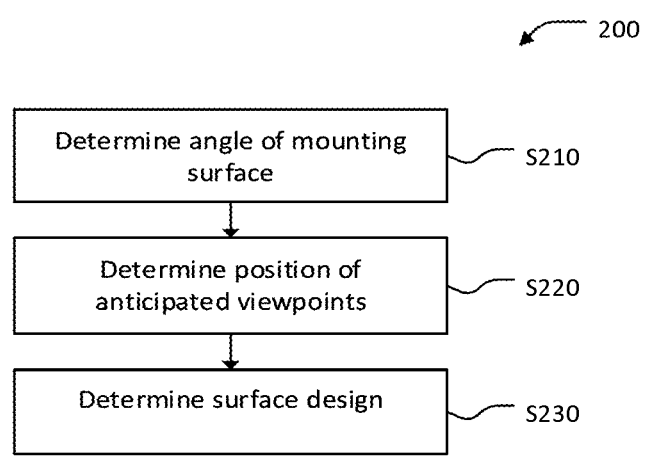
FIG. 2 illustrates a method of generating a surface design of a graphic in accordance with an embodiment.

FIG. 2 illustrates a method 200 of generating a surface design of a window graphic in accordance with an embodiment.

An angle of a mounting surface is determined at S210. For example, physical measurements can be taken of the mounting surface with respect to a vertical direction. In another example, the angle is predetermined and loaded from a database.

Positions of one or more anticipated viewpoints are determined at S220. Each of the anticipate viewpoints determined at S220 may be derived similarly to the anticipated viewpoints determined at S120, which is described with reference to FIG. 1.

A surface design is determined by adjusting a graphic design based on the angle of the mounting surface and the one or more anticipated viewpoints at S230. In an embodiment, a vertical dimension of the graphic design is vertically stretched according to the angle taken between the mounting surface and the vertical direction. For example, a dimension of the surface design is determined by dividing a corresponding dimension of the graphic design by a cosine of the angle taken between the mounting surface and the vertical direction.

In an embodiment, the angle of the mounting surface is adjusted based on the anticipated viewpoints before the surface design is determined. For example, if an anticipated viewpoint is located at a lower height than a midpoint of the mounting surface, the angle is adjusted based on a discrepancy angle between a horizontal direction and a line connecting the midpoint and the anticipated viewpoint.

The surface design includes a printed pattern and exposes a nonprinted pattern, in an embodiment. Accordingly, the printed pattern and the nonprinted pattern may be adjusted at S230. In an embodiment, the printed pattern is adjusted based on a first anticipated viewpoint located to one side of the mounting surface, and the nonprinted pattern is adjusted based on a second anticipated viewpoint located to another side of the mounting surface.

Subsequently, the surface design may be printed on a substrate, and the printed substrate may be installed on the mounting surface. In an embodiment, the substrate is customized to the mounting surface.

Figure 3:
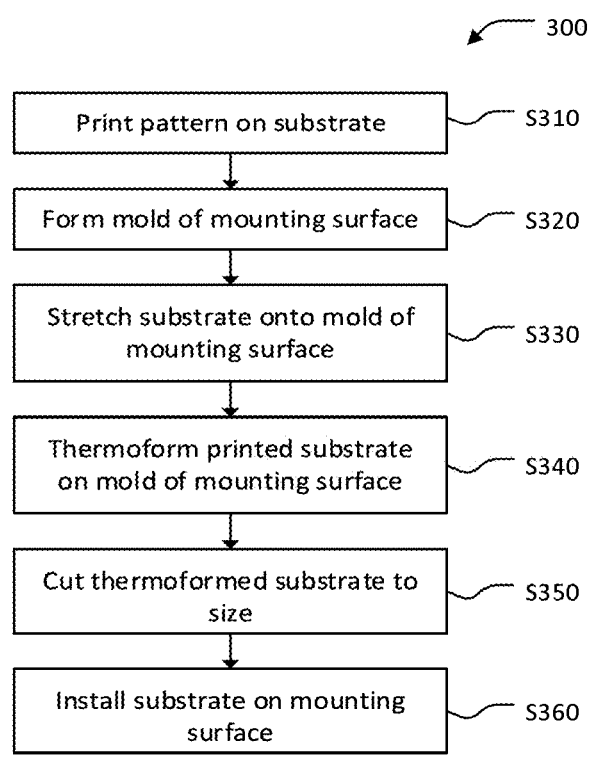
FIG. 3 illustrates a method of forming a graphic using the surface design in accordance with an embodiment.

FIG. 3 illustrates a method of forming a graphic using the surface design in accordance with an embodiment.

Using specific surface measurements of the mounting surface, the substrate can be manufactured to exactly fit the mounting surface. The substrate may be manufactured by first creating a mold, and molding the substrate to the mold.

A pattern is printed on a substrate at S310. The substrate is a film, for example. In an embodiment, the printed pattern exposes a nonprinted pattern on the substrate. For example, the printed pattern displays a geometric projection of a graphic design from a first viewpoint on the mounting surface, and the nonprinted pattern includes a geometric projection of a transparency design from a second viewpoint on the mounting surface. The printed pattern may be consistent with the surface design described with reference to FIG. 1 or 2.

In an embodiment, the pattern is printed using an ink-jet printer. The pattern includes one or more ink layers printed on the substrate. For example, the ink layers include a white ink layer a dark ink layer, and a transparent color ink layer. In a specific embodiment, the dark ink layer is disposed above the substrate, the white ink layer is disposed above the dark ink layer, and the transparent color ink layer is disposed above the white ink layer. In another embodiment, the transparent color ink layer is disposed under the substrate, the white ink layer is disposed under the transparent color ink layer, and the dark ink layer is disposed under the white ink layer. Accordingly, in embodiments, the dark ink layer is viewable underneath the substrate, whereas a viewer above the printed pattern sees a design comprising all of the ink layers.

In some embodiments, a transparent laminate is attached to the printed pattern on the substrate. The transparent laminate imparts UV stability, physical stability, etc. to the printed substrate according to various embodiments. However, the transparent laminate is omitted in other embodiments.

In various embodiments, the substrate includes a polymeric material and has a thickness between 0.2 and 0.5 mm. The polymeric material, for example, includes polycarbonate, polyethylene terephthalate glycol-modified (PETG), vinyl, or a combination thereof.

A mold of a mounting surface is formed at S320. In an embodiment, a surface of the mold is smooth and nonporous. The mold is formed, for example, using 3D surface measurements of the mounting surface that are obtained by 3D-scanning the mounting surface.

The printed substrate is stretched over the mold at S330.

The printed substrate is thermoformed on the mold at S340. The substrate is thermoformed at a higher temperature than an expected storage or use temperature, and at a lower temperature than a melting point of the pink printed on the substrate. For example, the substrate is thermoformed at a temperature between 175° and 220° F.

The thermoformed substrate is cut to a size of the mounting surface at S350. For example, outer edges of the substrate are cut to a shape of the mounting surface, the mold, or both.

The printed substrate is installed on the mounting surface at S360. In an embodiment, an adhesive is coated on a surface of the printed substrate. The adhesive-coated surface of the substrate is then attached to the mounting surface. To ensure that the printed substrate is evenly attached to the mounting surface, air bubbles that form between the printed substrate and the mounting surface during installation are pushed to an edge of the printed substrate as the printed substrate is being installed.

In an embodiment, the printed substrate is installed without a permanent adhesive. For example, the printed substrate is installed on the mounting surface with magnets or clips. Accordingly, the printed substrate is removable after installation.

In an embodiment, the graphic including the printed substrate is produced using 1) the specific surface measurements of the mounting surface, 2) structure surface context information, and/or a database of specific 3) relative-to-the-surface measurements and estimates stored in a database. In addition, the database can be updated with new measurements taken to manufacture the mounted graphic. The measurements and estimates may relate to spaces inside the structure. For example, if the mounting surface is a rear window of a vehicle, the measurements may be based off of a relative height of a driver's seat of the vehicle to the rear window of the vehicle.

Figure 4:
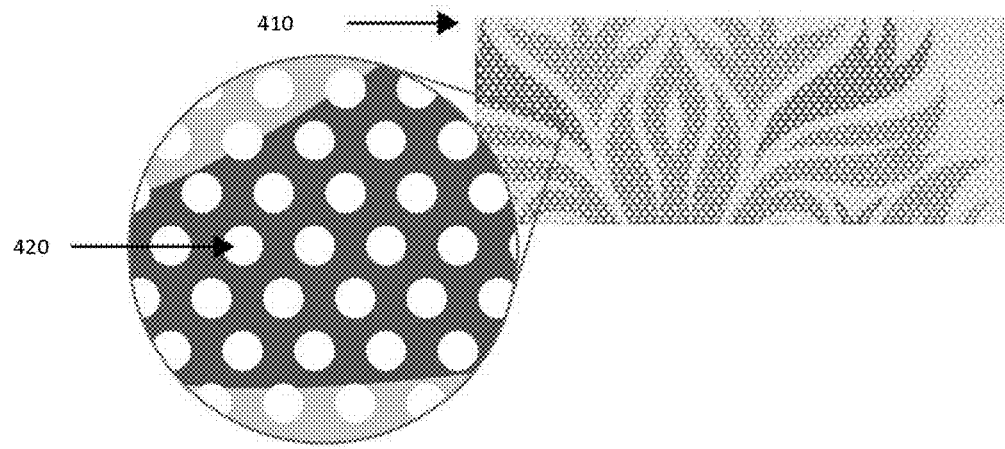
FIG. 4 illustrates an embodiment of a mounted graphic viewed on mounting surface according to an embodiment.

FIG. 4 illustrates an embodiment of a mounted graphic viewed on mounting surface according to an embodiment.

The mounted graphic includes a printed pattern 410 and an unprinted pattern 420. The printed pattern 410 includes one or more layers of ink having various transparencies and colors. Accordingly, the printed pattern 410 can display a highly customizable design.

The unprinted pattern 420 is exposed by the printed pattern 410, and includes a plurality of unprinted shapes.

When an underlying substrate on which the printed pattern 410 is deposited is transparent, the unprinted pattern 420 is also transparent.

According to an embodiment, the mounted graphic is visually customized for the mounting surface. When the mounted graphic is installed on the mounting surface and viewed from an anticipated viewpoint, the printed pattern 410 and the unprinted pattern 420 appear undistorted. In the specific embodiment of FIG. 4, the printed pattern 410 is perceived as displaying an undistorted printed design, and the unprinted pattern 420 is perceived as displaying an undistorted plurality of circular shapes.

However, if the mounting surface is not perfectly flat and perpendicular to a viewing direction, the mounted graphic appears differently when it is arranged perpendicular to the viewing direction. For example, the design of the printed pattern 410, and the shapes of the unprinted pattern 420 may appear distorted along the mounting surface.

Figure 5:
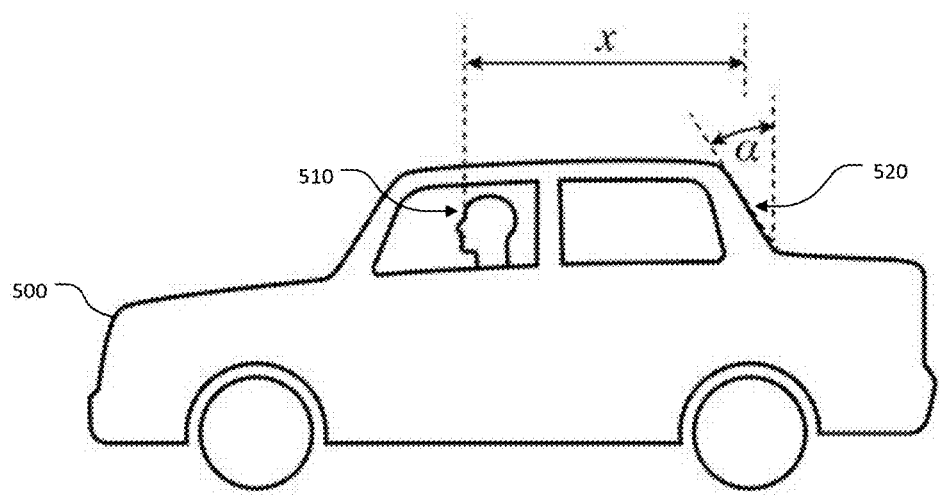
FIG. 5 illustrates an interior viewing angle according to an embodiment.

FIG. 5 illustrates an interior viewing angle, according to an embodiment, in which a graphic is mounted on a rear window of a car 500. In the embodiment illustrated in FIG. 5, a position of a driver's eyes 510 is an anticipated viewpoint.

A position of a rear window 520 of the car 500 is disposed an angle $\alpha$ relative to a vertical direction, e.g., a y direction. A distance x separates the position of the driver's eyes 510 from a position of the rear window 520 of the car 500, e.g., relative to an x direction. The position of the rear window 520 of the car 500 is, for example, a center of the rear window of the car 500.

In an embodiment, the angle $\alpha$ and the distance x are derived by taking measurements of the car 500. For example, the angle $\alpha$ and the distance x is be estimated based on structure surface context measurements.

For example, where the surface is the rear window of a car, the angle $\alpha$ of viewing for the driver is estimated by estimating the position x of the position of the driver's eyes 510 relative to the position of the rear window 520. In an embodiment, the position of the driver's eyes 510 is estimated by adding average human eye heights to the range of seat heights measured in the car 500. In another embodiment, the position of the driver's eyes 510 is estimated based on predetermined specifications supplied by the manufacturer of the car 500.

According to an embodiment, the estimated angle $\alpha$ and distance x are used to generate an unprinted pattern of the window graphic. That is, the angle $\alpha$ and distance x are used to generate an anticipated viewpoint of a viewer who perceives the window graphic as transparent.

The graphic may also be generated by measurements and estimates of spaces outside the structure. For example, a position of the eyes of an expected viewer, who is located outside of the car 500, is estimated based on external measurements of the car 500.

FIG. 6 illustrates an exterior viewing angle according to an embodiment.

As illustrated in FIG. 6, a graphic is installed on a rear window of a first car 600. A position of the rear window 620 is, for example, a center of the rear window of the first car 600. A second car 650 is positioned behind the first car 600. An anticipated viewpoint of the graphic is a position of a following driver's eyes 660, who is driving the second car 650.

A viewing angle $\alpha'$ corresponds to an estimated viewing angle the following driver's eyes 660 to the position of the rear window 620 on which the graphic is affixed. A distance x' corresponds to the distance between the following driver's eyes 660 and the position of the rear window 620 in front of the driver.

When the graphic is being viewed by the following driver of the car 650 behind the mounting surface of the graphic, the angle $\alpha'$ is estimated by estimating the location of the following driver's eyes 660 in 3D space and estimating the distance x' from the location of the driver's eyes 660 to the graphic at the position of the rear window 620 of the first car 600 in front of the following driver.

For example, the angle $\alpha'$ and the distance x' are estimated based on an average height of a human being, an average height of a driver seat, and/or an average following distance by vehicles during traffic.

According to an embodiment, the estimated angle $\alpha'$ and distance x' are used to generate a printed pattern of the graphic. That is, the angle $\alpha'$ and distance x' are used to generate an anticipated viewpoint of a viewer who perceives an image printed on the graphic.

By generating the graphic using 1) specific surface measurements of the structure on which the graphic is mounted, the 2) relative-to-the-surface measurements and estimates of viewers with respect to the structure, and 3) a two-dimensional graphic design to be displayed by the graphic, the graphic may be optimized-for a specific three-dimensional space according to an embodiment.

FIGS. 7a and 7b illustrate a graphic 700 viewed at different angles, according to an embodiment.

The graphic 700 includes a printed pattern 710 and a nonprinted pattern 720. In the embodiment illustrated in FIGS. 7a and 7b, the printed pattern 710 displays a printed image of the word "Hello." The nonprinted pattern 720 has a shape of a plurality of spots.

FIG. 7a shows a graphic 700 from a perpendicular viewing direction. For example, FIG. 7a shows a view of the graphic 700 when the graphic 700 is flattened and perpendicular to a line defined between a viewpoint and the center of the graphic 700.

The graphic 700 includes a printed pattern 710 and a nonprinted pattern 720. In the embodiment illustrated in FIGS. 7a and 7b, the printed pattern 710 displays a printed image of the word "Hello." The nonprinted pattern 720 has a shape of a plurality of spots.

As shown in FIG. 7a, the printed image of the printed pattern 710 and the plurality of spots of the nonprinted pattern 720 are distorted when the graphic 700 is viewed perpendicularly. That is, the printed pattern 710 and the nonprinted pattern 720 appear vertically elongated when the graphic 700 is viewed perpendicularly.

FIG. 7b shows the graphic 700 from an angled viewing direction. For example, FIG. 7b shows how the graphic 700 of FIG. 7a would be perceived while being installed on an angled mounting surface, e.g., a rear window of a vehicle. As shown, the printed pattern 710 is perceived as an intended graphic design 730, and the nonprinted pattern 720 is perceived as an intended transparency design 740.

In other words, the designs printed on the graphic 700 are undistorted when the graphic 700 is installed on the angled mounting surface, and viewed from an anticipated viewpoint.

Using a combination of 1) specific mounting surface information, 2) viewer-relative-to-the-surface information, and 3) a desired graphic to be displayed, a design that is optimized for three-dimensional space can be created, deposited on a substrate, and mounted on the mounting surface. The deposition pattern may achieve targeted light transmission, and may have optimized visual integrity for viewing the desired graphic outside the structure.

Figure 8A:
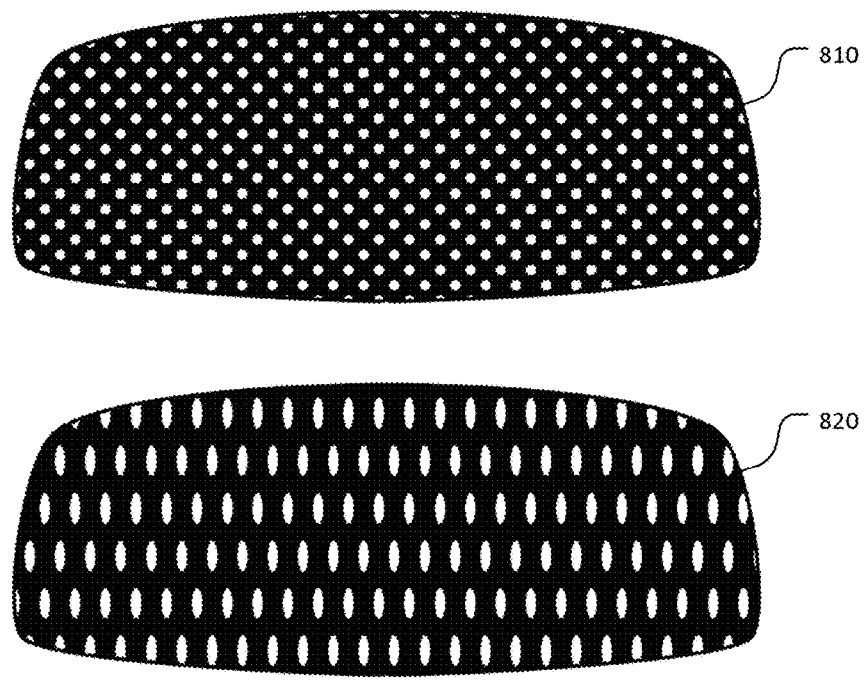
FIGS. 8a and 8b illustrate a non-optimized graphic and a surface-optimized graphic according to an embodiment.
Figure 8B:
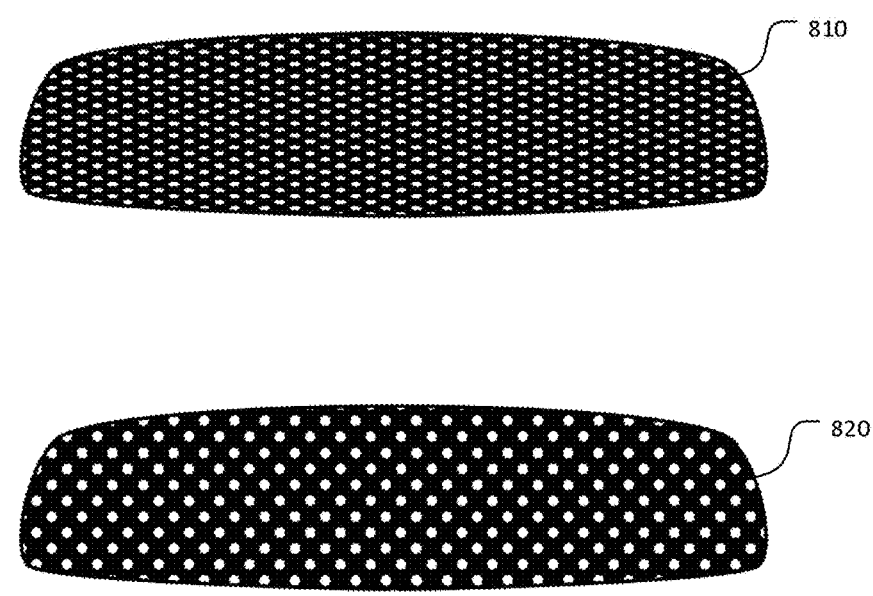

FIGS. 8a and 8b illustrate a non-optimized graphic 810 and a surface-optimized graphic 820 according to an embodiment.

FIG. 8a illustrates the non-optimized graphic 810 and the surface-optimized graphic 820 from a perpendicular viewing direction. If the desired pattern is a plurality of circular spots, the non-optimized graphic 810 shows the desired pattern when viewed perpendicularly, whereas the surface-optimized graphic 820 shows a distorted version of the desired pattern when viewed perpendicularly. That is, the spots of the surface-optimized graphic 820 are elongated compared to the desired pattern.

FIG. 8b illustrates the non-optimized graphic 810 and the surface-optimized window graphic 820 when they are installed on angled mounting surfaces. As shown, the non-optimized graphic 810 shows a distorted version of the desired pattern when it is installed on the mounting surface, whereas the surface-optimized graphic 820 shows the desired pattern when installed on the mounting surface.

Figure 9:
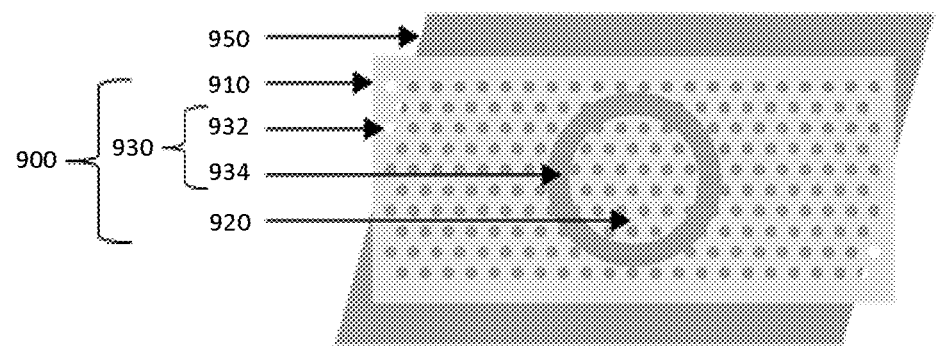
FIG. 9 illustrates a mounted graphic with a noncontinuous printed pattern according to an embodiment.

FIG. 9 illustrates a mounted graphic 900 with a noncontinuous printed pattern according to an embodiment.

The mounted graphic 900 includes a substrate 910, a printed pattern 920, and a nonprinted pattern 930. The mounted graphic 900 is configured to be installed on a mounting surface 950.

In an embodiment, the printed pattern 920 includes one or more ink layers disposed on the substrate 910. The nonprinted pattern 930 includes a plurality of circular dots 932 and a ring 934. In an embodiment, the nonprinted pattern 930 corresponds to a portion of the substrate 910 that is not printed with ink. That is, the nonprinted pattern 930 is exposed by the printed pattern 920.

The printed pattern 920 includes a first portion 822 and a second portion 824, which are disconnected from each other by the ring 934 of the nonprinted pattern 930. The printed pattern 920 maintains its graphical integrity during installation, because the printed pattern 920 is printed on a continuous substrate 910.

Accordingly, embodiments of the present disclosure can display portions of a pattern that are entirely separated by transparent patterns.

In contrast, a noncontinuous mounted graphic that uses cut-out shapes and/or perforations in place of the nonprinted pattern 930 of FIG. 9 could not maintain its graphical integrity during installation. Specifically, the noncontinuous mounted graphic would have a loose inner circle of printed substrate that could not be perfectly aligned to the rest of the substrate.

Figure 10:
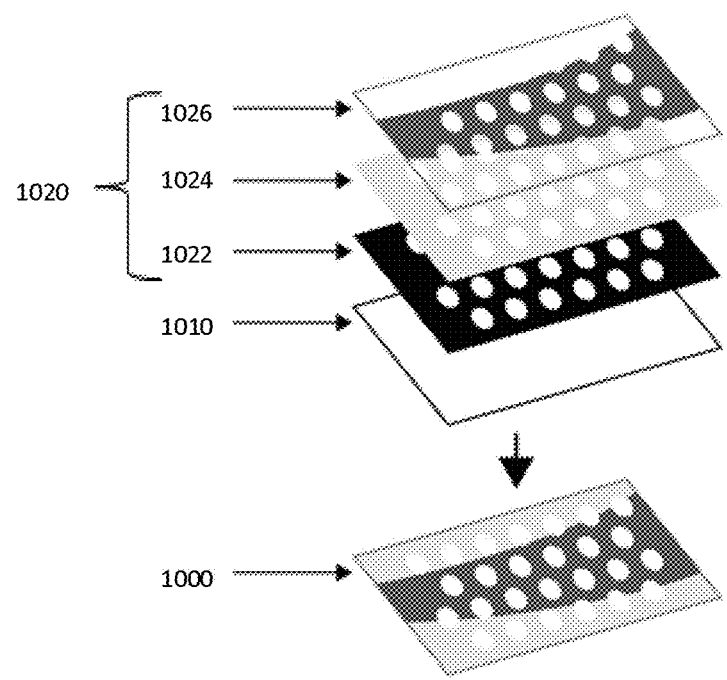
FIG. 10 illustrates a mounted graphic including a plurality of printed layers according to an embodiment.

FIG. 10 illustrates a mounted graphic 1000 including a plurality of printed layers according to an embodiment.

The mounted graphic 1000 includes a substrate 1010 and a printed pattern. The printed pattern includes a dark ink layer 1022, a white ink layer 1024, and a color ink layer 1026.

The substrate 1010 continuous (i.e., nonperforated). In an embodiment, the substrate 1010 is formed by stretching a film over a mold of a mounting surface, thermoforming the film on the mounting surface, and then trimming the thermoformed film. In an embodiment, the film includes a polymeric material.

In an embodiment, the mold includes a nonporous material. The mold is smooth and rigid, in order to prevent the mold from imparting small optical imperfections in the plastic film and reducing clarity of the substrate 1010.

In an embodiment, the polymeric material is printable. The polymeric material is capable of absorbing a printing ink, e.g., a digital printing ink used to print the printed pattern. The polymeric material is also capable of supporting second-surface-printing and displaying a high resolution image, without a significant loss in vividness in the printed image. For example, the polymeric material supports printing the design on a lower surface of the substrate, which is the surface of the substrate that is closest to the mounting surface after installation. Accordingly, the polymeric material is capable of displaying a vivid image having a depth effect according to an embodiment.

The substrate 1010, as well as the polymeric material, are optically transparent. Accordingly, a nonprinted pattern of the mounted graphic 1000 appears optically transparent.

The polymeric material is formable at a desired thermoforming temperature. The thermoforming temperature is low enough to not destroy ink of the printed pattern, which may be printed on the film before the film is thermoformed. The thermoforming temperature is high enough that the polymeric material does not lose its structural integrity during handling and storage. For example, the thermoforming temperature is lower than 220° F. and greater than 175° F.

The film is physically durable. For example, the polymeric material is UV-resistant, or the film is coated in an additional UV-resistant layer. According to an embodiment, the polymeric material is not easily splintered, frayed, weathered, torn, etc. In addition, the film is scratch-resistant. For example, the polymeric material is itself scratch-resistant, or the film is coated with a scratch resistant layer.

The film has memory according to an embodiment. That is, the polymeric material is elastic and able to resume a 3D shape formed by the thermoforming process, but is flexible enough to be rolled up, stored, and/or shipped in a rigid shipping tube. In addition, a thickness of the film supports memory. For example, the film has a thickness of 0.2 to 0.5 mm, but may have a different thickness depending on the polymeric material.

In an embodiment, the polymeric material includes any of PETG, vinyl, and similar materials.

In an embodiment, the printed pattern is deposited by applying a material, e.g., ink, to a portion of the substrate 1010, which includes the film. The printed pattern 1020 exposes a nonprinted pattern including viewing areas or 'holes,' analogous to the physical perforations in the current state of the art. However, the viewing areas or holes are not physical perforations of the substrate. Rather, the holes are areas where the transparent substrate is exposed.

The ink may be applied to the substrate 1010 in one or more layers at varying levels of coverage across the substrate to deliver specific light transmission requirements. The ink coverage ranges from limited coverage to create a partially transparent substrate and total coverage to block all light transmission through the substrate.

In an embodiment, the printed pattern includes an opaque base ink layer disposed on the substrate. For example, the base ink layer is the dark ink layer 1022. The dark ink layer 1022 may be added to optimize viewing through the substrate from the inside of a structure on which the substrate 1010 is affixed. For example, a first viewer may view a graphic formed by the printed pattern, and a second viewer on an opposite side of the graphic from the first viewer views a nonprinted pattern, or a transparency pattern, formed by unprinted portions of the substrate. In this example, the dark ink layer 1022 reduces the visibility of the graphic displayed by the printed pattern for the second user.

The white ink layer 1024, of varying levels of coverage, may be added on top of the dark ink layer 1022 to maximize the saturation of the colors in the printed graphic, when, for example, the color inks of the color ink layer 1026 are transparent.

In an embodiment, the printed pattern is printed on a lower surface of the substrate 1010. Accordingly, the base ink layer is the color ink layer 1026, the white ink layer 1024 is printed on the color ink layer 1026, and the dark ink layer 1022 is printed on the white ink layer 1024. In an embodiment, the printed pattern is disposed between the substrate and the mounting surface after installation, and the printed pattern is therefore shielded from the elements without the presence of an additional lamination layer.

The nonprinted pattern includes "no coverage" areas that are as transparent as the substrate 1010, which is fully transparent or semi-transparent.

The nonprinted pattern includes areas that have different shapes (circular, oval, chevron, rectangular, etc.) and various sizes according to different embodiments. Because the printed pattern 1020 is deposited on a continuous substrate 1010, in an embodiment, the nonprinted pattern includes areas that separate portions of the printed pattern 1020 from each other, without separating the graphic 1000 into multiple pieces.

Using embodiments of the present disclosure, one can then print shapes, letters, etc. in various colors to create a graphic visible from outside of the structure on which the substrate is affixed.

Figure 11:
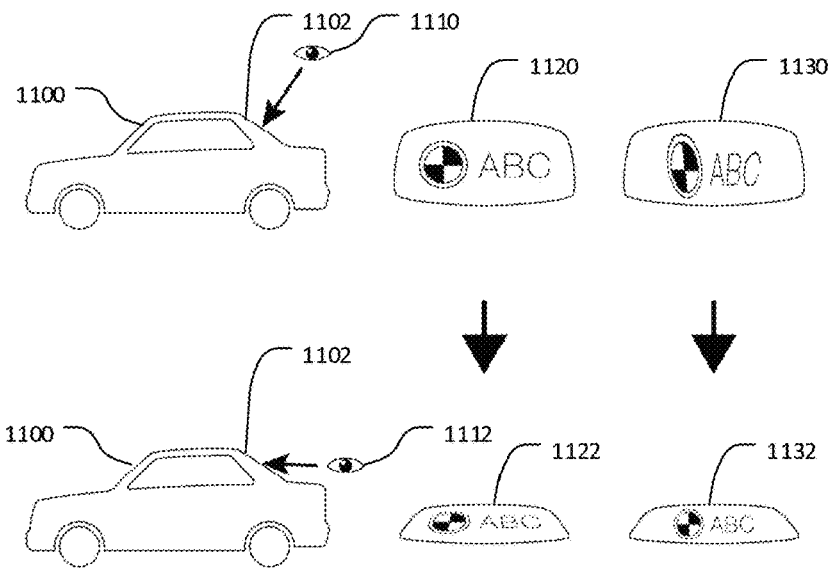
FIG. 11 illustrates an example of printed patterns and perceived patterns of graphics according to an embodiment.

FIG. 11 illustrates an example of printed patterns and perceived patterns of graphics according to an embodiment.

A structure 1100 (e.g., a car) has a mounting surface 1102 (e.g., a rear window of the car). According to various embodiments, the mounting surface 1102 is affixed with a non-optimized mounted graphic and an optimized mounted graphic.

As viewed from a perpendicular viewpoint 1110, a printed pattern of the non-optimized mounted graphic 1120 appears undistorted, and a printed pattern of the optimized mounted graphic 1130 appears distorted. For example, when the mounting surface 1102 tilted at an angle with respect to a vertical direction, the printed pattern of the optimized mounted graphic 1130 appears vertically elongated.

As viewed from an anticipated viewpoint 1112, however, a perceived pattern of the non-optimized mounted graphic 1122 appears distorted, and a perceived pattern of the optimized mounted graphic 1132 appears undistorted. For example, the perceived pattern of the optimized mounted graphic 1132 is consistent with a graphic design that is intended to be displayed to a viewer with the anticipated viewpoint 1112.

Figure 12:
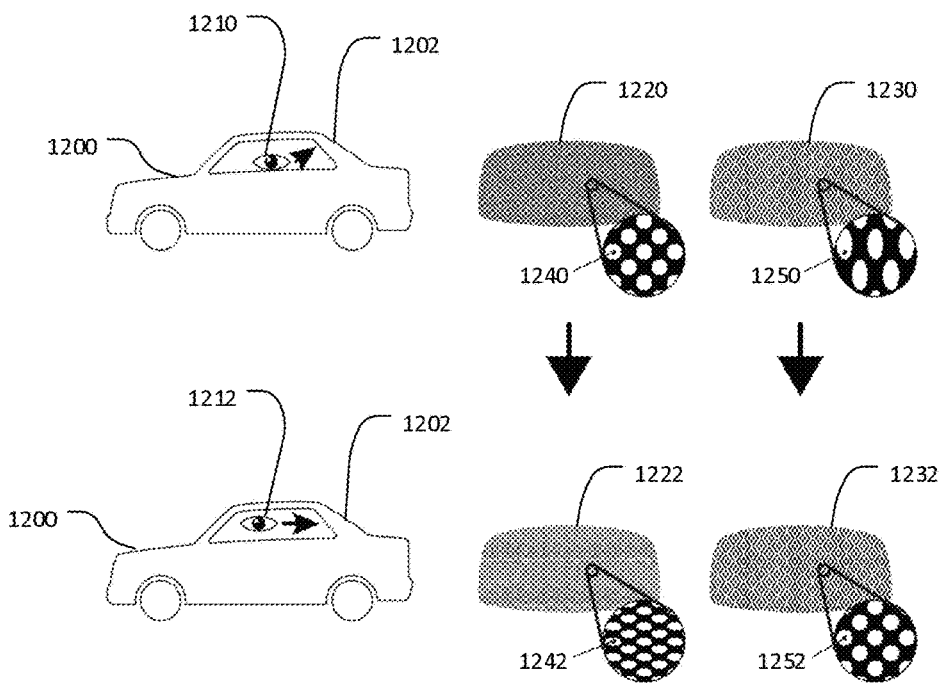
FIG. 12 illustrates an example of nonprinted patterns and perceived nonprinted patterns of graphics according to an embodiment.

FIG. 12 illustrates an example of nonprinted patterns and perceived nonprinted patterns of graphics according to an embodiment.

A structure 1200 (e.g., a car) has a mounting surface 1202 (e.g., a rear window of the car). According to various embodiments, the mounting surface 1202 is affixed with a non-optimized mounted graphic and an optimized mounted graphic.

As viewed from a perpendicular viewpoint 1210, an element 1240 of a nonprinted pattern of the non-optimized mounted graphic 1120 appears undistorted, and an element 1250 of a nonprinted pattern of the optimized mounted graphic 1230 appears distorted. For example, when the mounting surface 1202 tilted at an angle with respect to a vertical direction, the element 1250 of the nonprinted pattern of the optimized mounted graphic 1230 appears vertically elongated.

As viewed from an anticipated viewpoint 1212, however, an element 1242 of a perceived nonprinted pattern of the non-optimized mounted graphic 1222 appears distorted, and an element 1252 of a perceived nonprinted pattern of the optimized mounted graphic 1232 appears undistorted. For example, the perceived pattern of the optimized mounted graphic 1232 is consistent with a transparency design that is intended to be perceived by a viewer with the anticipated viewpoint 1212.

Figure 13:
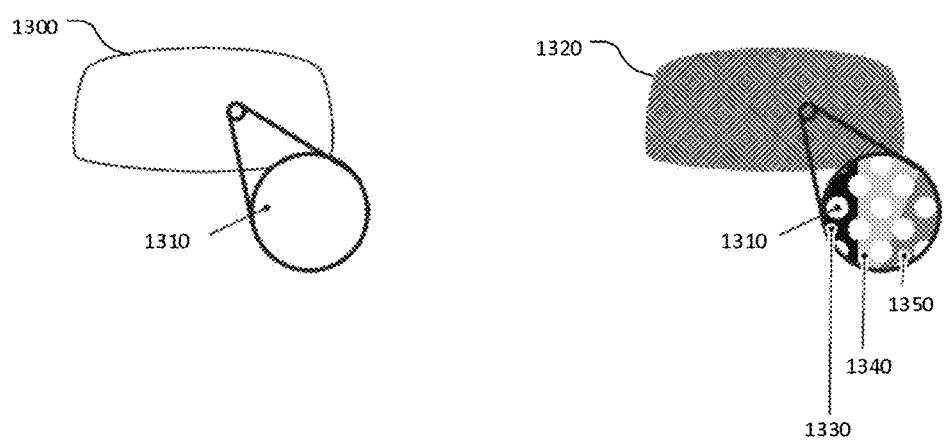
FIG. 13 illustrates an example of a mounted graphic with varying levels of transparency according to an embodiment.

FIG. 13 illustrates an example of a mounted graphic with varying levels of transparency according to an embodiment.

A substrate 1300 is transparent. For example, an area 1310 of the substrate is transparent.

A mounted graphic 1320 including the substrate 1330 has various levels of transparency according to an embodiment. For example, the area 1310 of the substrate is fully transparent, and a nonprinted pattern exposing the area 1310 is similarly fully transparent.

A first printed area 1330, which includes one or more stacked ink layers, is opaque. For example, the first printed area 1330 is fully opaque or 0% transparent.

A second printed area 1340, which includes one or more stacked ink layers, is not fully transparent or opaque, but is partially transparent.

A third printed area 1350, which includes one or more stacked ink layers, is partially transparent, but less transparent and opaquer than the second printed area 1340. In a specific example, the third printed area 1350 is 40% transparent, and the second printed area 1340 is 80% transparent.

Accordingly, mounted graphics including transparent substrates may support more than two levels of transparency. In contrast, a perforated mounted graphic with an opaque substrate may only support two levels of transparency by being fully transparent in the perforations, and fully opaque outside of the perforations.

Figure 14:
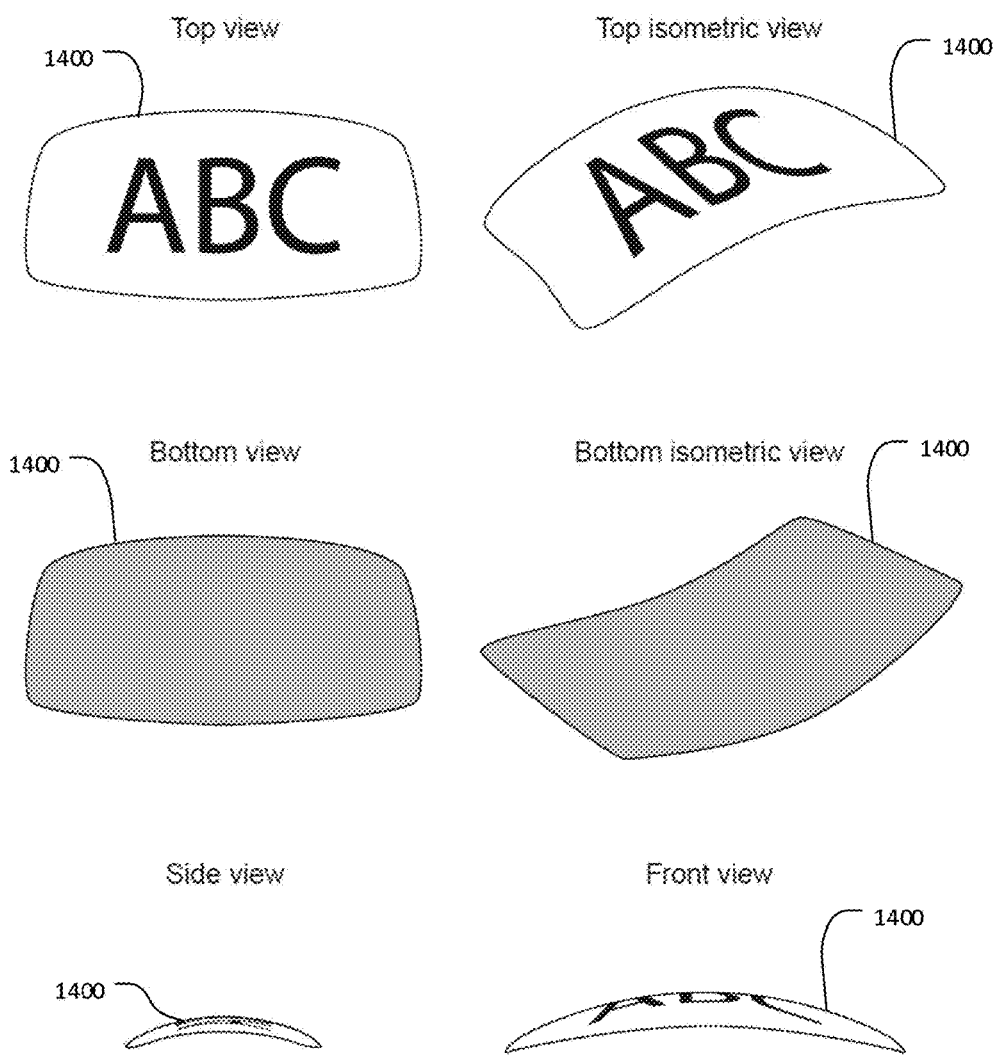
FIG. 14 illustrates a printed substrate that conforms to a curved mounting surface according to an embodiment.

FIG. 14 illustrates a printed substrate 1400 that conforms to a curved mounting surface according to an embodiment.

When the printed substrate 1400 is viewed from above, the printed substrate 1400 displays an image to the viewer. As illustrated in FIG. 14, the image is spells out "ABC."

When the printed substrate 1400 is viewed from below, however, the image is partially or completely hidden from the viewer. In an embodiment, the printed substrate 1400 appears transparent from a lower viewpoint due to a non-printed pattern.

According to various embodiments, the printed substrate 1400 is thermoformed to a mold of the curved mounting surface before or after being printed.

A mounted graphic according to an embodiment includes, for example, the printed substrate 1400.

Figure 15:
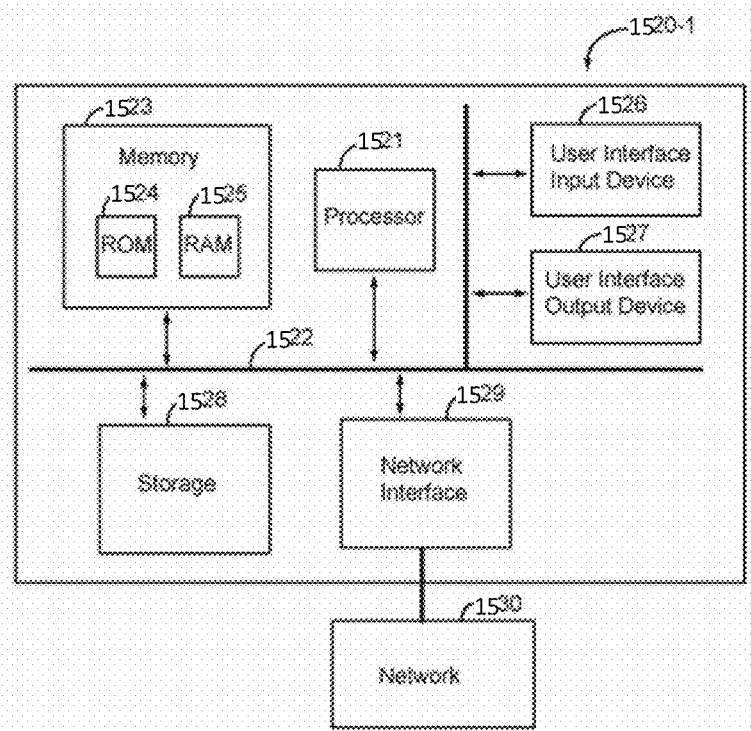
FIG. 15 illustrates a computer system according to an embodiment of the present disclosure.

FIG. 15 illustrates a computer system 1520-1 according to an embodiment of the present disclosure.

As shown in FIG. 15, the computer system 1520-1 may include one or more of a processor 1521, a memory 1523, a user input device 1526, a user output device 1527, and a storage 1528, each of which communicates through a bus 1522. The computer system 1520-1 may also include a network interface 1529 that is coupled to a network 1530. The processor 1521 may be a central processing unit (CPU) or a semiconductor device that executes processing instructions stored in the memory 1523 and/or the storage 1528. The memory 1523 and the storage 1528 may include various forms of volatile or non-volatile storage media. For example, the memory may include a read-only memory (ROM) 1524 and a random access memory (RAM) 1525.

An embodiment of the invention is implemented as a computer implemented method or as a non-transitory computer readable medium with computer executable instructions stored thereon. In an embodiment, when executed by the processor, the computer readable instructions may perform a method according to at least one aspect of the invention.

A graphic, according to an embodiment of the present disclosure, provides a number of benefits over traditional window-mounted graphics. For example, because the substrate of the mounted graphic is not physically perforated, a substrate of the mounted graphic is not as prone to soiling, damage, wind resistance, etc., as perforated materials.

In addition, the material comprising the substrate is relatively unrestricted. According to various embodiments, the substrate includes any transparent material (i.e. glass, plexiglass, plastic, polycarbonate, etc.).

The substrate can be manufactured to deliver specific physical properties that are targeted to a specific application. For example, the substrate could be made of a material that physically supports a glass mounting surface, and which helps the glass resist breakage. In another example, the substrate could include a material that is resistant to ultraviolet (UV) light, and/or filters out UV light.

The mounted graphic according to embodiments of the present disclosure may not need lamination. The mounted graphic may display a desired graphic without a lamination layer or seal covering the graphic.

If adhesives are used in a method to affix the substrate, embodiments of the mounted graphic can be installed using different adhesives. For example, because the substrate is continuous, a weaker adhesive could be used than adhesives used to attach perforated window graphics. The weaker adhesive may facilitate gliding and may enable an easier installation. In an embodiment, and adhesive used to affix the substrate may be weaker than adhesives required to affix a perforated substrate.

If adhesives are not used to affix the substrate, different installation methods may be used. For example, magnets or clips may be used to attach the mounted graphic to the mounting surface.

Embodiments enable the optimization of light transmission.

Embodiments enable the optimization of graphic integrity.

Embodiments enable the optimization of graphic viewability (based upon surface shape, angle, and final graphic design) as the transparent components of the finished product can be granularly controlled for every installation to enable truly custom applications.

While several embodiments of the present invention have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment. Instead, the scope of the invention should be determined from the appended claims that follow.

What is claimed is:

1. A method of manufacturing a car window graphic, comprising:
    forming a substrate, the substrate being configured to attach to a mounting surface and being transparent and continuous;
    depositing a printed pattern over the substrate, the printed pattern exposing a nonprinted pattern, wherein the printed pattern includes a geometric projection of a graphic design on the mounting surface from a first viewpoint, and wherein the nonprinted pattern is a geometric projection of a transparency design on the mounting surface from a second viewpoint;
    generating three-dimensional (3D) coordinates of the mounting surface, the first viewpoint, and the second viewpoint;
    generating 3D coordinates of the printed pattern by projecting image data of the graphic design onto the 3D coordinates of the mounting surface from the 3D coordinates of the first viewpoint, and by projecting image data of the transparency design onto the 3D coordinates of the mounting surface from the 3D coordinates of the second viewpoint; and
    converting the 3D coordinates of the printed pattern into two-dimensional (2D) coordinates along the mounting surface,
    wherein depositing the printed pattern on the substrate includes printing one or more ink layers on the substrate in accordance with the 2D coordinate.

2. The method of claim 1, wherein the graphic design is an undistorted image disposed perpendicularly to a line defined from the first viewpoint to a center of the mounting surface, and
    wherein the transparency design is an undistorted image disposed perpendicularly to a line defined from the second viewpoint to the center of the mounting surface.

3. The method of claim 2, wherein the mounting surface is curved.

4. The method of claim 1, wherein the mounting surface is a surface of a rear window of a first vehicle,
    wherein the first viewpoint is an estimated viewpoint of a driver in a second vehicle behind the first vehicle, and
    wherein the second viewpoint is an estimated viewpoint of a driver of the first vehicle.

5. The method of claim 1, wherein forming the substrate includes thermoforming a polymeric material to a mold of the mounting surface.

6. The method of claim 1, wherein generating the 3D coordinates of the mounting surface includes scanning the mounting surface with a 3D scanner.

7. The method of claim 1, further comprising:
    attaching the substrate to the mounting surface via an adhesive; and
    trimming the attached substrate at an edge of the mounting surface.

* * * * *